US007714539B2

(12) United States Patent
Ishikawa

(10) Patent No.: US 7,714,539 B2
(45) Date of Patent: May 11, 2010

(54) APPARATUS FOR REGULATING STATE OF CHARGE IN BATTERY ASSEMBLY

(75) Inventor: Satoshi Ishikawa, Makinohara (JP)

(73) Assignee: Yazaki Corporation, Tokyo (JP)

( * ) Notice: Subject to any disclaimer, the term of this patent is extended or adjusted under 35 U.S.C. 154(b) by 479 days.

(21) Appl. No.: 11/508,905

(22) Filed: Aug. 24, 2006

(65) Prior Publication Data

US 2007/0046260 A1 Mar. 1, 2007

(30) Foreign Application Priority Data

Aug. 24, 2005 (JP) .......................... P2005-242577

(51) Int. Cl.
*H02J 7/00* (2006.01)
*H02J 7/04* (2006.01)

(52) U.S. Cl. ...................... 320/116; 320/118; 320/132; 320/136; 320/128; 320/119

(58) Field of Classification Search ................ 320/108, 320/136, 116, 118, 119, 120, 127, 128, 132, 320/134, 135, 137, 148, 149
See application file for complete search history.

(56) References Cited

U.S. PATENT DOCUMENTS 5,932,932 A * 8/1999 Agatsuma et al. .......... 307/10.6
5,994,873 A * 11/1999 Shiojima .................... 320/118
6,268,710 B1 * 7/2001 Koga .......................... 320/116
6,803,766 B2 * 10/2004 Kobayashi et al. .......... 324/434
6,828,757 B2 * 12/2004 Furukawa ................... 320/116
7,352,155 B2 * 4/2008 Li et al. ...................... 320/118
2003/0146737 A1 * 8/2003 Kadouchi et al. ........... 320/132
2004/0056639 A1 * 3/2004 Saigo et al. ................. 320/120
2004/0189248 A1 * 9/2004 Boskovitch et al. ......... 320/116
2007/0046260 A1 * 3/2007 Ishikawa .................... 320/124

FOREIGN PATENT DOCUMENTS

JP 10-225005 A 8/1998
JP 2002-199510 A 7/2002
JP 2004-120871 A 4/2004

* cited by examiner

*Primary Examiner*—Edward Tso
*Assistant Examiner*—Alexis Boateng
(74) *Attorney, Agent, or Firm*—Sughrue Mion, PLLC

(57) ABSTRACT

A plurality of discharge resistors Rd1 to Rdn having different resistance values is provided. A CPU 72 selects one from a plurality of unit cells B1 to B16 as a connection cell and selects one resistance value according to a voltage across the connection cell from the plurality of resistance values. The CPU 72 turns on/off a cell selecting switch group 2, a polarity reversing switch group 3 and a discharge resistor selecting switch group 5 and connects the connection cell to the discharge resistor having the selected resistance value to discharge stored electric charge of the connection cell, thereby equalizing the respective voltages across the unit cells.

5 Claims, 8 Drawing Sheets

1
7
ROM
CPU
RAM
73
72
74
71
A/D
μ COM
6
5
Rd
Rd1
Rd2
Rd1
S5n
S52
S51
4
S41
S42
C
3
S31
S32
S33
S34
L2
L1
2
S216
S215
S214
S25
S24
S23
S22
S21
S20
B
B16
B15
B5
B4
B3
B2
B1

1
B
B16
B15
B5
B4
B3
B2
B1
2
S216
S215
S214
S25
S24
S23
S22
S21
S20
L2
L1
3
S31
S32
S33
S34
RL
RLn
RL2
RL1
8
S8n
S82
S81
C
4
S41
S42
6
7
ROM
CPU
RAM
73
72
74
71
A/D
μ COM

APPARATUS FOR REGULATING STATE OF CHARGE IN BATTERY ASSEMBLY

BACKGROUND OF THE INVENTION

1. Field of the Technical Field

The present invention relates to an apparatus for regulating state of charge in a battery assembly, and more particularly, to an apparatus for regulating state of charge in a battery assembly which includes secondary cells as a plurality of unit cells connected in series.

2. Description of the Related Art

In an electric car driven by an electric motor and in a hybrid electric car driven by both an engine and an electric motor, a battery assembly including a plurality of secondary cells as unit cells connected in series, such as a nickel-metal hydride battery or a lithium battery, has been employed as an electric source for the electric motor.

It has been known that the above-described battery assembly has had such a problem that due to repeated charging and discharging of electricity, variations may occur in respective voltages across the unit cells depending on the state of charge (SOC) of the unit cells, and in the case where charging and discharging of electricity are repeated while the variations remain unsolved, some of the unit cells may fall in an excessively charged state or in an excessively discharged state.

Under the circumstances, a discharge type apparatus for regulating state of charge, which can solve variations in respective voltages across a plurality of unit cells by extracting a minimum unit cell having a minimum voltage from the plurality of unit cells, sequentially connecting the unit cells except the minimum unit cell to a discharge resistor, and discharging stored electric charge until the respective voltages across the connected unit cells are equal to the voltage across the minimum unit cell, is proposed (for example, Japanese Unexamined Patent Application Publication No. 2002-199510).

In addition, a charge pump type apparatus for regulating state of charge, which can solve variations in the respective voltages across a plurality of unit cells by transferring electric charge from a unit cell having a high voltage to a unit cell having a low voltage through a capacitor is proposed. As an example of the charge pump type apparatus for regulating the state of charge, it is proposed that unit cells are sequentially connected to a capacitor (Japanese Unexamined Patent Application Publication 1998-225005). In this structure, electric charge of the unit cell which has a higher voltage than a voltage across the capacitor is transferred to the capacitor, and contrarily, electric charge of the capacitor is transferred to the unit cell which has a lower voltage than the voltage across the capacitor. In other words, the stored electric charge is transferred from the unit cell having the higher voltage to the unit cell having the lower voltage by way of the capacitor, and consequently, the variations in the respective voltages across the unit cells can be eliminated.

It is proposed that a capacitor is alternately connected to a maximum unit cell having a maximum voltage and a minimum unit cell having a minimum voltage (Japanese Unexamined Patent Application Publication No. 2004-120871). In this structure, since the electric charge is repeatedly transferred from the maximum unit cell to the minimum unit cell, the respective voltages across the unit cells can be equalized in a short time. Since the capacitor has a very small internal resistance, connection between each of the unit cells and the capacitor is necessarily performed by a current limiting resistor, the current limiting resistor limits charging and discharging current which flows in the unit cells and over-current is prevented from flowing.

However, in the discharge type apparatus for regulating the state of charge, the discharge resistor having one resistance value is connected regardless of the sizes of the voltages across the unit cells. The resistance value of the discharge resistor is determined to a value for allowing discharge current equal to or less than allowable current to flow when a unit cell having a full-charged state is connected to the discharge resistor. The allowable current is determined according to the characteristics of the secondary cell included as the unit cell and the secondary cell may deteriorate when the discharge is performed by current exceeding the allowable current.

Accordingly, when the voltage across the unit cell is relatively large, discharge current which flows from the unit cell to the discharge resistor is high and the voltage across the unit cell becomes the voltage across the minimum unit cell. In contrast, when the voltage across the unit cell is small, the discharge current which flows from the unit cell to the discharge resistor decreases and it takes a considerable time to regulate the voltage across the unit cell to the voltage across the minimum unit cell. Thus, as the voltage across the unit cell decreases, it takes a considerable time to equalize the voltages across the plurality of unit cells.

In the charge pump type apparatus for regulating the state of charge, the current limiting resistor having one resistance value is connected regardless of a difference between a voltage across the unit cell and a voltage across the capacitor. Accordingly, when the difference between the voltage across the unit cell and the voltage across the capacitor is large, charge/discharge current which flows between the unit cell and the capacitor is high and a large amount of charge can be transferred in a short time. In contrast, when the difference between the voltage across the unit cell and the voltage across the capacitor decreases by equalization, the charge/discharge current which flows between the unit cell and the capacitor decreases and thus it takes a considerable time to transfer the electric charge. As the results, as the difference between the voltage across the unit cell and the voltage across the capacitor decreases, it takes a considerable time to equalize the respective voltages across the plurality of unit cells.

SUMMARY OF THE INVENTION

Accordingly, in view of the above-described problems, an object of the present invention is to provide an apparatus for regulating state of charge in a battery assembly, which can equalize respective voltages across unit cells in a short time.

In order to solve the above-described problems, according to the invention of claim 1, there is provided an apparatus for regulating state of charge in a battery assembly, the apparatus including: discharge resistors which discharge a plurality of unit cells included in the battery assembly and connected in series; cell selecting means which selects at least one from the plurality of unit cells as a connection cell; and equalizing means which connects the connection cell selected by the selecting means to the discharge resistor and discharges the electric charge of the connection cell to equalize respective voltages across the unit cells, wherein the discharge resistors have a plurality of resistance values, wherein the equalizing means has resistor selecting means which selects one resistance value according to the voltage across the connection cell from the plurality of resistance values and connects the connection cell to one discharge resistor having the resistance value selected by the resistor selecting means among the discharge resistors.

According to the invention of claim 1, the discharge resistors having the plurality of resistance values are provided. The resistor selecting means selects one resistance value according to the voltage across the connection cell from the plurality of resistance values and connects the connection cell to the discharge resistor having the resistance value selected by the resistor selecting means to discharge the stored electric charge of the connection cell, thereby equalizing the respective voltages across the unit cells. Accordingly, since one resistance value according to the voltage across the connection cell is selected from the plurality of resistance values, the discharge can be performed by high discharge current although the voltage across the connection cell is small and, as a result, a discharge duration can shorten.

According to the invention of claim 2, it is preferable that the resistor selecting means selects a minimum resistance value from the resistance values equal to or larger than a resistance value for discharging the connection cell by predetermined allowable current.

According to the invention of claim 2, the resistor selecting means selects the minimum resistance value from the resistance values equal to or larger than the resistance value for discharging the connection cell by the predetermined allowable current. Accordingly, since the minimum resistance value is selected from the resistance values equal to or larger than the resistance value for discharging the connection cell by the allowable current and connected to the connection cell, it is possible to select a resistance value for allowing highest discharge current to flow among the discharge values by which the discharge current exceeding the allowable current does not flow.

According to the invention of claim 3, there is provided an apparatus for regulating state of charge in a battery assembly, the apparatus including: a capacitor through which stored electric charge is transferred among a plurality of unit cells included in the battery assembly and connected in series; selecting means which selects at least one from the plurality of unit cells as a connection cell; equalizing means which connects the connection cell selected by the selecting means to the capacitor and transfers stored electric charge among the unit cells through the capacitor to equalize respective voltages across the unit cells; and current limiting resistors which limit charge/discharge current which flows in the connection cell, wherein the current limiting resistors have a plurality of resistance values, and wherein the equalizing means has resistor selecting means which selects one resistance value according to a difference between a voltage across the connection cell and a voltage across the capacitor from the plurality of resistance values and connects the connection cell to the capacitor through one current limiting resistor having the resistance value selected by the resistor selecting means among the current limiting resistors.

According to the invention of claim 3, the current limiting resistors having the plurality of resistance values are provided. The resistor selecting means selects one resistance value according to the difference between the voltage across the connection cell and the voltage across the capacitor from the plurality of resistance values and connects the connection cell to the capacitor through one current limiting resistor having the resistance value selected by the resistor selecting means to transfer stored electric charge among the unit cells, thereby equalizing the respective voltage across the unit cells. Accordingly, one resistance value according to the difference between the voltage across the connection cell and the voltage across the capacitor is selected from the plurality of resistance values and interposed between the capacitor and the connection cell. Thus, although the difference between the voltage across the connection cell and the voltage across the capacitor is small, the unit cells can be charged/discharged by high charge/discharge current and, as a result, a large amount of electric charge can be transferred between the capacitor and the connection cell in a short time.

According to the invention of claim 4, it is preferable that the resistor selecting means selects a minimum resistance value from the resistance values equal to or larger than a resistance value for charging/discharging the connection cell by predetermined allowable current when the connection cell is connected to the capacitor.

According to the invention of claim 4, the resistor selecting means selects the minimum resistance value from the resistance values equal to or larger than the resistance value for charging/discharging the connection cell by the predetermined allowable current when the connection cell is connected to the capacitor. Accordingly, since the minimum resistance value is selected from the resistance values equal to or larger than the resistance value for charging/discharging the connection cell by the predetermined allowable current and interposed between the capacitor and the connection cell, it is possible to select a resistance value for allowing highest discharge current to flow among the resistance values by which the discharge current exceeding the allowable current does not flow.

As described above, according to the invention of claim 1, since one resistance value according to the voltage across the connection cell is selected from the plurality of resistance values, the discharge can be performed by high discharge current although the voltage across the connection cell is small and, as a result, a discharge duration can shorten. Thus, equalization can be performed in a short time.

According to the invention of claim 2, since the minimum resistance value is selected from the resistance values equal to or larger than the resistance value for discharging the connection cell by the allowable current and connected to the connection cell, it is possible to select a resistance value for allowing highest discharge current to flow among the discharge values by which the discharge current exceeding the allowable current does not flow. As a result, it is possible to perform equalization in a shorter time.

According to the invention of claim 3, one resistance value according to the difference between the voltage across the connection cell and the voltage across the capacitor is selected from the plurality of resistance values and interposed between the capacitor and the connection cell. Thus, although the difference between the voltage across the connection cell and the voltage across the capacitor is small, the unit cells can be charged/discharged by high charge/discharge current and, as a result, a large amount of electric charge can be transferred between the capacitor and the connection cell in a short time. Thus, equalization can be performed in a short time.

According to the invention of claim 4, since the minimum resistance value is selected from the resistance values equal to or larger than the resistance value for charging/discharging the connection cell by the predetermined allowable current and interposed between the capacitor and the connection cell, it is possible to select a resistance value for allowing highest discharge current to flow among the resistance values by which the discharge current exceeding the allowable current does not flow. As a result, it is possible to perform equalization in a shorter time.

DESCRIPTION OF THE PREFERRED EMBODIMENTS

First Embodiment

Figure 1:
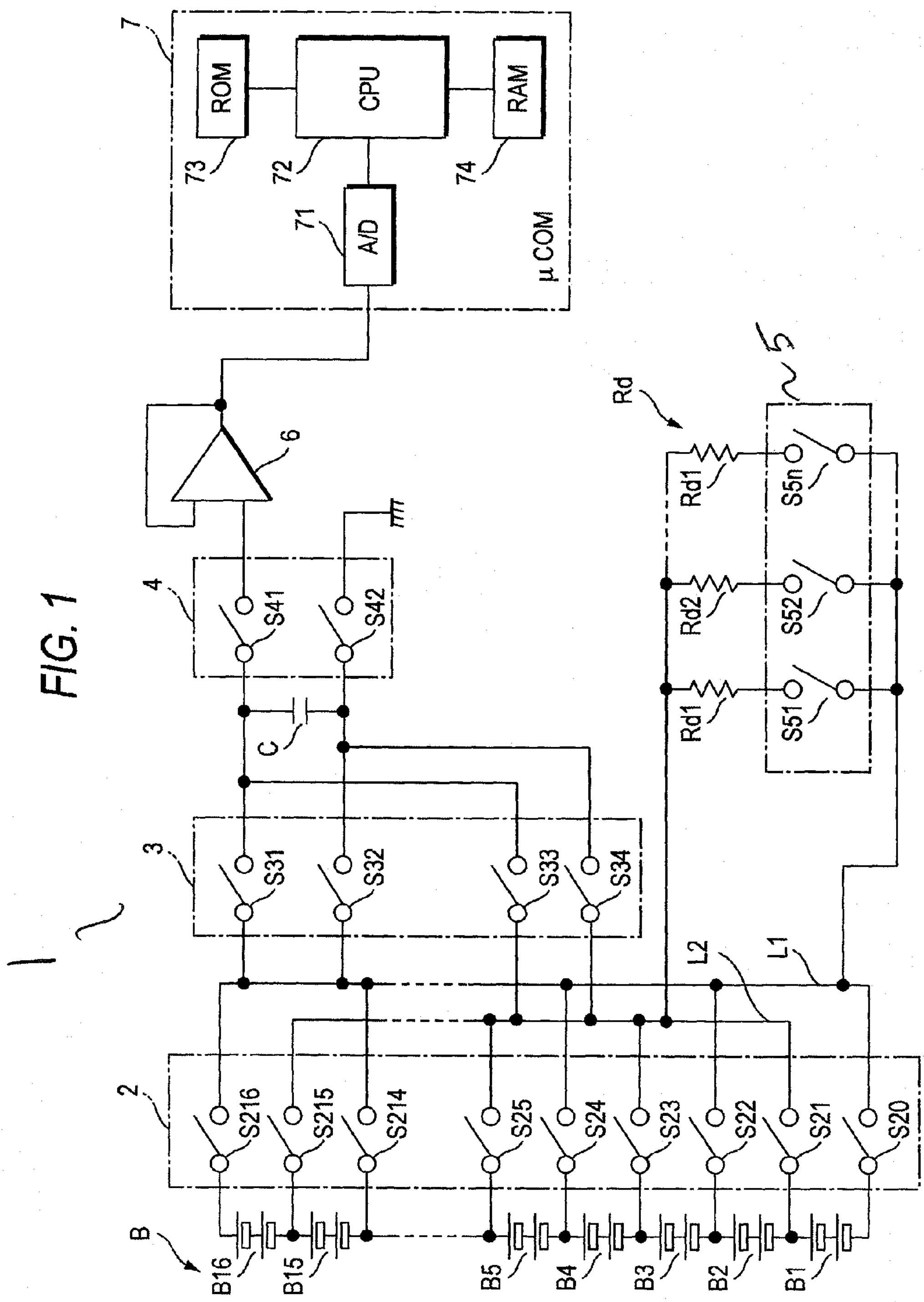
FIG. 1 is a circuit diagram showing an apparatus 1 for regulating state of charge in a battery assembly according to a first embodiment of the present invention.

Hereinafter, a first embodiment of the present invention will be described with reference to the accompanying drawings. FIG. 1 is a circuit diagram showing an apparatus for regulating state of charge in a battery assembly (hereinafter, referred to as a regulating apparatus) according to the first embodiment of the present invention. In FIG. 1, a reference numeral 1 denotes the regulating apparatus according to the present embodiment. The regulating apparatus is a discharge type apparatus for equalizing respective voltages across sixteen unit cells B1 to B16 by sequentially selecting one from the unit cells B1 to B16, which are included in a main battery B and connected in series, as a connection cell and connecting the selected connection cell to any one of discharge resistors Rd1 to Rdn to discharge stored electric charge of the unit cells B1 to B16. In the present embodiment, each of the unit cells B1 to B16 includes two secondary cells connected in series.

The main battery B is, for example, used as an electric source in a hybrid electric car employing both an engine and an electric motor (both are not shown) as driving sources. The electric motor or the like is connected the both ends of the main battery B as a load according to necessity, and an alternator or the like (not shown) is connected thereto as a charging device according to necessity.

The regulating apparatus 1 according to the present embodiment includes a cell selecting switch group 2, a polarity reversing switch group 3, a voltage detecting switch group 4, a discharge resistor selecting switch group 5, a buffer circuit 6, a capacitor C, a discharge resistor group Rd and a microcomputer (hereinafter, referred to as μCOM 7) 7.

The cell selecting switch group 2 is provided between the unit cells B1 to B16 and the capacitor C and between the unit cells B1 to B16 and the discharge resistor group Rd, selectively connects at least one of the unit cells B1 to B16 to the capacitor C and the discharge resistor group Rd, and includes switches S20 and S216 of which one ends are connected to the both ends of the main battery B and switches S21 to S215 of which one ends are connected to connection points among the unit cells B1 to B16. The other ends of the switches S20, S22, S24, . . . , S214 and S216 are commonly connected to a common line L1 and the other ends of the switches S21, S23, S25, . . . , and S215 are commonly connected to a common line L2.

The polarity reversing switch group 3 is provided between the cell selecting switch group 2 and the capacitor C, connects the positive terminals of the unit cells B1 to Bn selected by the cell selecting switch group 2 to the positive terminal of the capacitor C (upper side), connects the negative terminals of the unit cells B1 to Bn to the negative terminal of the capacitor C (lower side), and includes switches S31 to S34. The switch S31 is connected between the common line L1 and the positive terminal of the capacitor C and the switch S32 is connected between the common line L1 and the negative terminal of the capacitor C. The switch S33 is connected between the common line L2 and the positive terminal of the capacitor C and the switch S34 is connected between the common line L2 and the negative terminal of the capacitor C.

According to this configuration, when odd unit cells B1, B3, B5, . . . , and B15 are connected to the capacitor C, the unit cells B1, B3, . . . , and B15 and the capacitor C can be connected to each other such that the terminals thereof are matched to each other in respect of the polarity, by turning off the switches S31 and S34 and turning on the switches S32 and S33. When even unit cells B2, B4, B6, . . . , and B16 are connected to the capacitor C, the unit cells B2, B4, . . . , and B16 and the capacitor C can be connected to each other such that the terminals thereof are matched to each other in respect of the polarity, by turning on the switches S31 and S34 and turning off the switches S32 and S33.

The voltage detecting switch group 4 is provided between the capacitor C and the μCOM 7, supplies the voltage across the capacitor C to the μCOM 7 through the buffer circuit 6, and includes a pair of switches S41 and S42. The switch S41 is connected between the positive terminal of the capacitor C and the buffer circuit 6 and the switch S42 is connected between the negative terminal of the capacitor C and ground. As the buffer circuit 6, for example, an operational amplifier is used. The voltage across the capacitor C is output to an analog/digital (A/D) converter 71 of the μCOM 7 through the buffer circuit 6. The A/D converter 71 may be embedded in the μCOM 7, as shown in FIG. 1, or may be provided independent of the μCOM 7.

The μCOM 7 has the A/D converter 71, a central processing unit (hereinafter, referred to as CPU 72) for performing various processes or controls according to programs, a read-only memory (ROM) 73 which stores the programs for the processes of the CPU 72, a random access memory (RAM) 74 which stores various data and has work areas for reading and writing to be utilized in the various processes of the CPU 72.

The discharge resistor group Rd includes discharge resistors Rd1 to Rdn connected in parallel and having different resistance values. The discharge resistor selecting switch group 5 is provided between the cell selecting switch group 2 and the discharge resistor group Rd, selectively connects any one of the discharge resistors Rd1 to Rdn to any one of the unit cells B1 to Bn selected by the cell selecting switch group 2, and includes n switches S51 to S5*n* which are connected to the discharge resistors Rd1 to Rdn in series, respectively. The switches included in the cell selecting switch group 2, the polarity reversing switch group 3, the voltage detecting switch group 4 and the discharge resistor selecting switch group 5 are turned on/off by the CPU 72.

Figure 2:
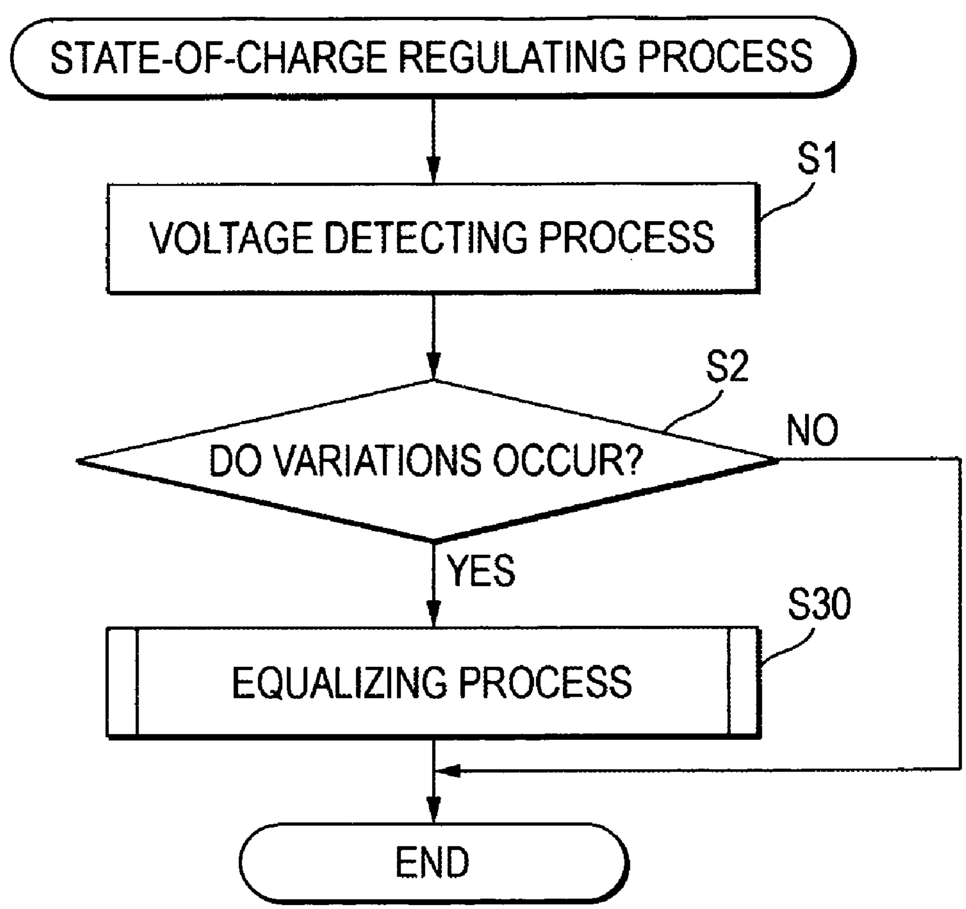
FIG. 2 is a flowchart showing a state-of-charge regulating process of a CPU 72 included in the regulating apparatus 1 of FIG. 1.
Figure 3:
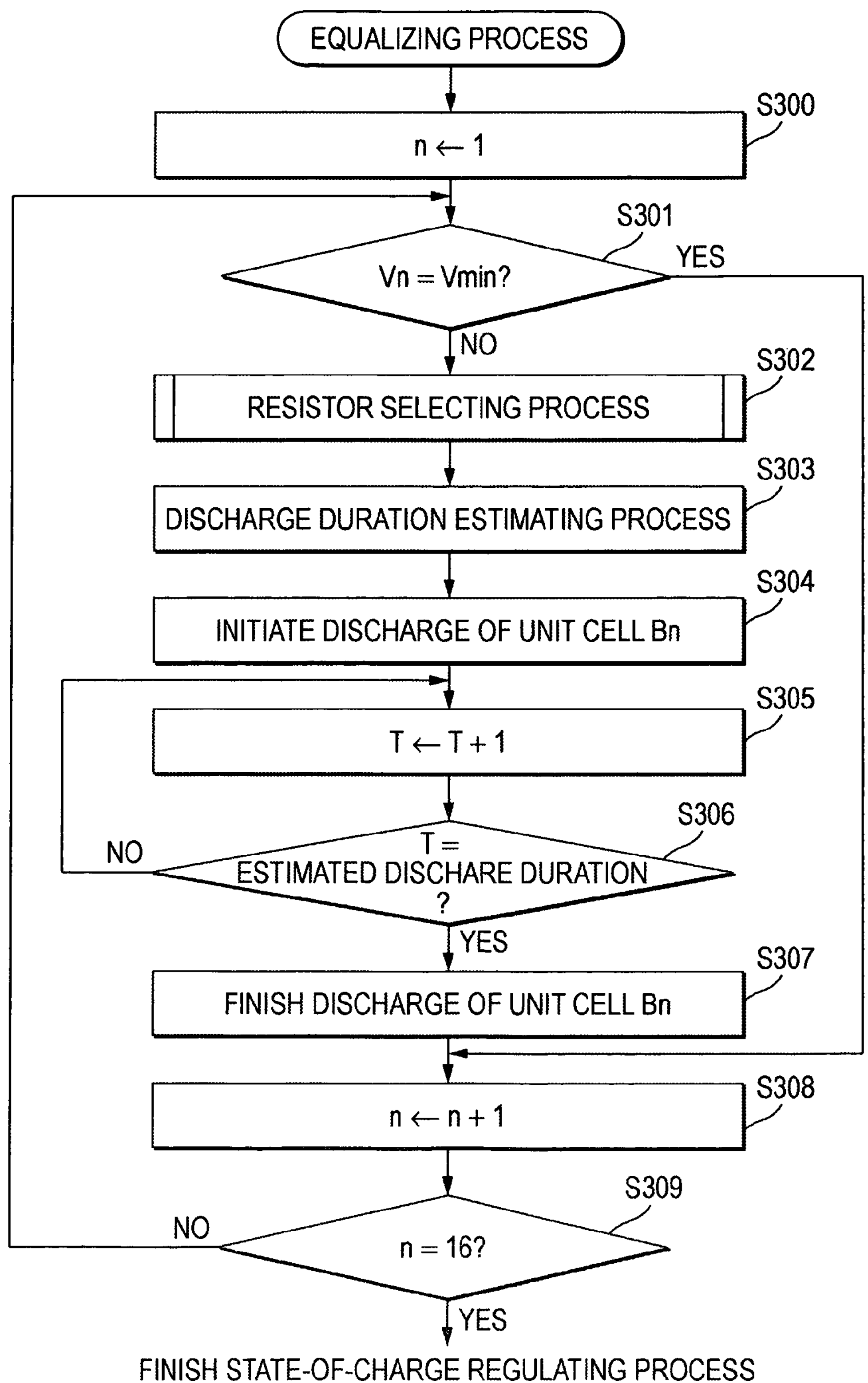
FIG. 3 is a flowchart showing an equalizing process of the CPU 72 included in the regulating apparatus 1 of FIG. 1.
Figure 4:
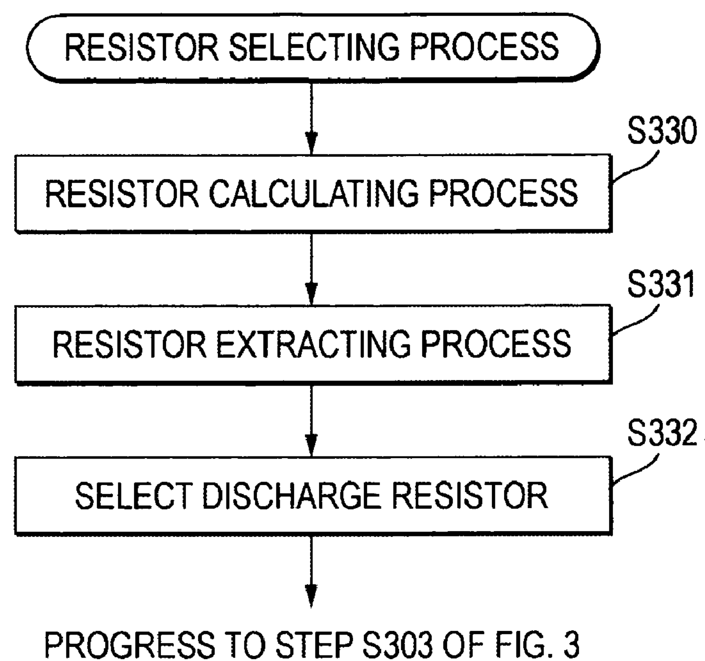
FIG. 4 is a flowchart showing a resistor selecting process of the CPU 72 included in the regulating apparatus 1 of FIG. 1.

Hereinafter, the operation of the regulating apparatus 1 having the above-described structure will be described with reference to FIGS. 2 to 4. FIG. 2 is a flowchart showing a state-of-charge regulating process of the CPU 72 included in the regulating apparatus 1. FIG. 3 is a flowchart showing an equalizing process of the CPU 72. FIG. 4 is a flowchart showing a resistor selecting process of the CPU 72. The CPU 72 included in the μCOM 7 initiates the state-of-charge regulating process by turning on an ignition switch. As shown in FIG. 2, in the state-of-charge regulating process, first, the CPU 72 performs a voltage detecting process for detecting the respective voltages across the unit cells B1 to B16 (step S1).

In the voltage detecting process, first, the CPU 72 detects the voltage across the unit cell B1. More specifically, the CPU 72 turns off the switch S41 and S42 included in the voltage detecting switch group 4 to disconnect the capacitor C from the μCOM 7. The CPU 72 turns on switches S20 and S21 connected to the both ends of the unit cell B1 and turns on the switches S33 and S32. As a result, the positive terminal of the unit cell B1 is connected to the positive terminal of the capacitor C and the negative terminal of the unit cell B1 is connected to the negative terminal of the capacitor C. By this connection, the voltage across the capacitor C becomes equal to the voltage across the unit cell B1.

Next, the CPU 72 turns off the switches S20 and S21 and the switches S33 and S32 to disconnect the capacitor C from the main battery B and turns on the switches S41 and S42 included in the voltage detecting switch group 4. As a result, the voltage across the capacitor C equal to the voltage across of the unit cell B1 is output to the A/D converter 71 through the buffer circuit 6. The CPU 72 reads the digital value of the voltage across the capacitor C output from the A/D converter 71 and stores the digital value in the RAM 74 as the voltage across the unit cell B1. Similarly, the voltages across the unit cells B2 to B16 are sequentially detected using the capacitor C.

Next, the CPU 72 determines whether variations occur in the respective voltages across the unit cells B1 to B16, based on the respective voltages across the unit cells B1 to B16 detected in the voltage detecting process (step S2). In a step (S2), the CPU 72 extracts a minimum unit cell Bmin which has a minimum voltage and a maximum unit cell Bmax which has a maximum voltage from the unit cells B1 to B16, determines that the variations occur if a difference between the voltage across the maximum unit cell Bmax and the voltage across the minimum unit cell Bmin is equal to or larger than a threshold value, and determines that the variations do not occur if the difference is less than the threshold value.

If it is determined that the variations do not occur (N in the step S2), the CPU 72 finishes the state-of-charge regulating process, without performing the equalizing process of the below-described step S30. Meanwhile, if it is determined that the variations occur (Y in the step S2), the CPU performs the equalizing process which equalizes the respective voltages across the unit cells B1 to B16 by sequentially selecting one from the unit cells B1 to B16 as the connection cell, connecting the selected connection cell to any one of the discharge resistors Rd1 to Rdn to discharge stored electric charge in the unit cells B1 to B16 (step 30). In the equalizing process, the CPU 72 acts as equalizing means and eliminates the variations in the respective voltages across the unit cells B1 to B16 by sequentially selecting one from the unit cells B1 to B16 except the minimum unit cell Bmin which has the minimum voltage as the connection cell, connecting the selected connection cell to any one of the discharge resistors Rd1 to Rdn to discharge the electric charge until the voltage across the connection cell becomes the voltage Vmin across the minimum unit cell Bmin.

Hereinafter, the detailed operation of the equalizing process will be described with reference to FIG. 3. First, the CPU 72 acts as cell selecting means, sets a counter value n to 1, and selects the unit cell B1 as the connection cell (step S300). Next, it is determined whether the voltage Vn across the connection cell Bn is equal to the voltage Vmin across the minimum unit cell Bmin (step S301). If the voltage Vn is equal to the voltage Vmin across the minimum unit cell Bmin (Y in the step S301), the CPU 72 progresses the process to a step S308 without performing the below-described steps S302 to S307. Meanwhile, if the voltage Vn is not equal to the voltage Vmin across the minimum unit cell Bmin (N in the step S301), the CPU 72 acts as resistor selecting means and performs a resistor selecting process for selecting one discharge resistor according to the voltage Vn across the connection cell Bn from the discharge resistors Rd1 to Rdn (step S302). In the resistor selecting process, the CPU 72 selects a smaller resistance value as the voltage Vn across the connection cell Bn is reduced.

Hereinafter, the detailed operation of the resistor selecting process will be described with reference to FIG. 4. First, the CPU 72 performs a resistor calculating process for calculating the resistance value Vn/Ip of the discharge resistor for discharging the connection cell Bn by allowable current Ip (step S330). The allowable current Ip is previously determined according to the characteristics of the secondary cell included in the unit cells B1 to B16 and the secondary cell may deteriorate when the discharge is performed by current exceeding the allowable current Ip. Next, the CPU 72 performs a resistor extracting process for extracting discharge resistors having at least resistance values Vn/Ip calculated in the resistor calculating process from the discharge resistors Rd1 to Rdn (step S331). Thereafter, the CPU 72 selects a discharge resistor having a minimum resistance value from the discharge resistors extracted in the resistor extracting process (step S332) and then progresses the process to a step S303. Hereinafter, a case where the discharge resistor Rdm (m is an integer) is selected will be described.

Next, the CPU 72, as shown in FIG. 3, performs a discharge duration estimating process for estimating a discharge duration from a time when the both ends of the connection cell Bn are connected to the discharge resistor Rdm to a time when the voltage Vn across the connection cell Bn becomes the voltage Vmin across the minimum unit cell Bmin, based on the voltage across the connection cell Bn and the resistance value of the discharge resistor Rdm (step S303).

The detailed contents of the discharge duration estimating process will be described. First, an equilibrium-state open-circuit voltage of the connection cell Bn is obtained from the voltage across the connection cell Bn as a present OCV. Next, an equilibrium-state open-circuit voltage of the minimum unit cell Bmin is obtained from the voltage across the minimum unit cell Bmin as a target OCV. More specifically, when the state of the battery assembly is in the equilibrium state, the voltage across the connection cell Bn and the voltage Vmin across the minimum unit cell Bmin are set to the present OCV and the target OCV, respectively, and, when the state of the battery assembly is not in the equilibrium state, the present OCV is estimated from the voltage across the connection cell Bn and the voltage Vmin across the minimum unit cell Bmin.

The present OCV and the target OCV obtained above are substituted to Equation 1 to obtain the discharge duration h.

$$\text{Discharge duration } (h)=\{\text{present } OCV-\text{target } OCV\}\cdot\text{full charge capacity } (Ah)/)\text{full charge voltage}-\text{discharge end voltage})\}/\text{discharge current} \quad \text{(Equation 1)}$$

The discharge current is obtained by the present OCV/discharge resistor Rdm.

For example, if the full charge voltage is 4.5 V, the discharge end voltage is 3 V, the full charge capacity is 1 Ah, the present OCV is 3.8 V, the target OCV is 3.7 V, and the discharge current is 0.05 V, the discharge duration is expressed by Equation 2.

$$\text{Discharge duration }(h)=\{(3.8V-3.7V)\cdot 1\text{ Ah}/4.5V-3V)/\}0.05\text{ A}=1.33\text{ h} \quad \text{(Equation 2)}$$

Thereafter, the CPU 72 turns on the switches S2*n*-1 and 2*n* connected between the both ends of the connection cell Bn and turns on the switch S5*m* connected to the discharge resistor Rdm selected in the resistor selecting process, and connects the discharge resistor Rdm to the connection cell Bn, thereby initiating the discharge of the connection cell Bn (step S304).

The CPU 72 initiates the count of elapsed time T (step S305). If the elapsed time T becomes the discharge duration estimated in the discharge duration estimating process (Y in the step S306), the CPU 72 determines that the voltage Vn across the connection cell Bn becomes the voltage Vmin across the minimum unit cell Bmin. Then, the CPU 72 turns off the switch 2*n*-1 and the switch S5*m* connected to the both ends of the connection cell Bn and disconnects the connection cell Bn from the discharge resistor Rdm, thereby finishing the discharge of the connection cell Bn (step S307).

Next, the CPU 72 acts as cell selecting means, increases a count value n by one, and selects the unit cell Bn+1 as the connection cell (step S308). If the count value n becomes 16 by increasing the count value n (Y in the step S309), the CPU 72 determines that the stored electric charge in all the unit cells B1 to B16 except the minimum unit cell Bmin is discharged and becomes equal to the voltage Vmin across the minimum unit cell Bmin and the equalization is finished, and finishes the state-of-charge regulating process. Meanwhile, if the count value n does not become 16 (N in the step S309), the CPU 72 progresses the process to the step S301. As can be seen from the above-described operation, the cell selecting switch group 2, the polarity reversing switch group 3, the discharge resistor selecting switch group 5 and the μCOM 7 configure the equalizing means.

According to the above-described apparatus for regulating the state of charge, the discharge resistors Rd1 to Rdn have a plurality of different resistance values, respectively. The CPU 72 selects one resistance value according to the voltage across the connection cell Bn from the plurality of resistance values in the resistor selecting process, and connects the connection cell Bn to the discharge resistor Rdm having the resistance value selected in the resistor selecting process and discharges stored electric charge in the connection cell Bn to equalize the respective voltages across the unit cells B1 to B16 in the equalizing process. Accordingly, since the discharge resistor having the resistance value according the voltage across the connection cell Bn among the plurality of resistance values is selected and connected to the connection cell Bn, the discharge can be performed by large discharge current although the voltage across the connection cell Bn is small, and the discharge duration until the voltage across the connection cell Bn becomes the voltage Vmin across the minimum unit cell Bmin can shorten. As a result, the equalization can be performed in a short time.

The CPU 72 calculates the resistance value Vn/IP for discharging the connection cell Bn by the predetermined allowable current Ip in the resistor calculating process and extracts the discharge resistors having the resistance value of at least Vn/Ip calculated by the resistor calculating process among the plurality of resistance values in the resistor extracting process. The CPU 72 selects a discharge resistor having a minimum resistance value from the discharge resistors extracted by the resistor extracting process. Accordingly, since the discharge resistor having the minimum resistance value among the discharge resistors Rd1 to Rdn having at least the resistor value Vn/Ip calculated in the resistor calculating process is selected and connected to the connection cell Bn, the discharge resistor having the resistance value for allowing largest discharge current from flowing can be selected from the discharge resistors by which the discharge current exceeding the allowable current Ip does not flow and the equalization can be performed in a shorter time.

In the first embodiment, the resistance value Vn/Ip for discharging the connection cell Bn by the predetermined allowable current Ip is calculated in the resistor calculating process, the resistance values of at least Vn/Ip calculated by the resistor calculating process are extracted from the plurality of resistance values in the resistor extracting process, and the minimum resistance value is selected from the resistance values extracted by the resistor extracting process. However, the present invention is not limited thereto. For example, a table representing a correspondence between the voltage Vn across the connection cell Bn and the resistance values of the discharge resistors Rd1 to Rdn, in which, for example, the voltage Vn across the connection cell Bn which is equal to or larger than 0.4 and less than 0.5 corresponds to the resistance value Rd1 and the voltage Vn across the connection cell Bn which is equal to or larger than 0.3 and less than 0.4 corresponds to the resistance value Rd2, etc., may be previously stored in the storage means such as the ROM 73 and the resistance values of the discharge resistors Rd1 to Rdn may be selected according to the table representing the correspondence.

In the table representing the correspondence, the voltage Vn across the connection cell Bn may correspond to the resistance values of the discharge resistors Rd1 to Rdn such that the minimum resistance value is selected from the resistance values of at least Vn/Ip for discharging the connection cell Bn by the allowable current Ip or a smaller resistance value may be selected as the voltage across the connection cell Bn is reduced.

In the first embodiment, the respective discharge resistors Rd1 to Rdn are selected with respect to the unit cells B1 to B16 except the minimum unit cell Bmin. In consideration that the variations which occur in the unit cells B1 to B16 are not sufficient to cause a large difference in discharge current, a discharge resistor according to the voltage Vmax across the maximum unit cell Bmax which has the maximum voltage may be selected from the unit cells B1 to B16 and the selected discharge resistor may be sequentially connected to the unit cells B1 to B16 except the maximum unit cell.

In the first embodiment, one unit cell is selected from the plurality of unit cells B1 to B16 and connected to the discharge resistor. When at least two unit cells Bn, Bn+1, . . . connected in series have the same voltage Vn=Vn+1, . . . and are not the minimum unit cell Bmin (□Vn=Vn+1= . . . ≠ Vmin), the at least two unit cells Bn, Bn+1, . . . may be selected as the connection cell and connected to the discharge resistor together. In this case, the discharge resistor having the resistance value according to the sum (Vn+Vn+1 . . . ) of the respective voltages Vn, Vn+1, . . . across the unit cells Bn, Bn+1, . . . for configuring the connection cell is selected.

In the first embodiment, the plurality of discharge resistors Rd1 to Rdn having different resistance values are provided and one discharge resistor is selected from the n discharge resistors and connected to the connection cell Bn. However, the present invention is not specially limited as long as the plurality of resistance values is provided such that the discharge resistors having the plurality of resistance values can be selectively connected to the connection cell. For example, the plurality of resistance values may be selectively provided by providing n discharge resistors having a same resistance value in parallel and selecting the number of the discharge resistor connected to the connection cell. A combination of at least two of the discharge resistors Rd1 to Rdn having different resistance values may be selected.

Second Embodiment

Figure 5:
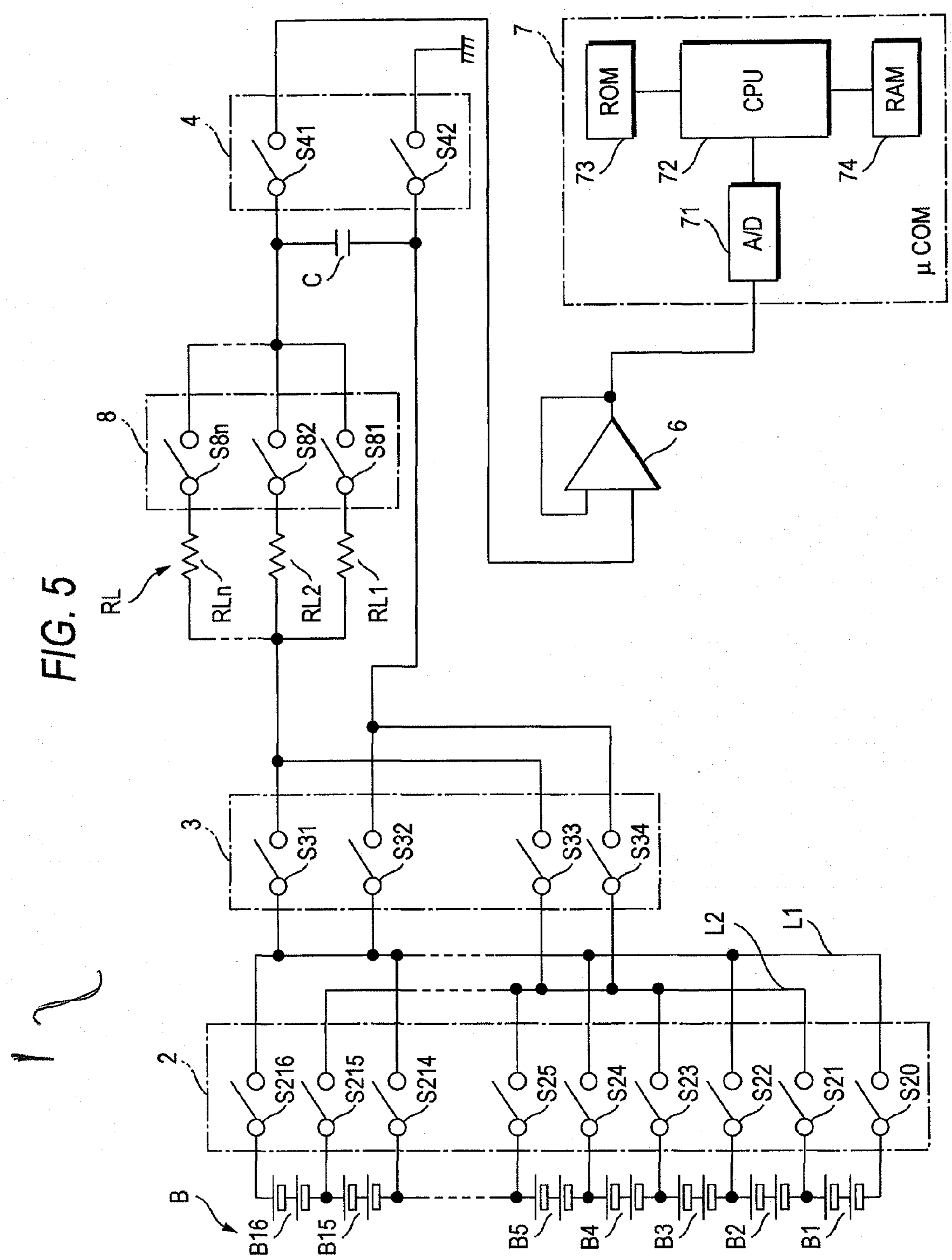
FIG. 5 is a circuit diagram showing an apparatus 1 for regulating state of charge in a battery assembly according to a second embodiment of the present invention.

Hereinafter, a second embodiment of the present invention will be described with reference to the accompanying drawings. FIG. 5 is a circuit diagram showing an apparatus 1 for regulating state of charge in a battery assembly according to a second embodiment of the present invention. In FIG. 5, the same parts as FIG. 1 are denoted by the same reference numerals and their detailed description will be omitted. In FIG. 5, a reference numeral 1 denotes the regulating apparatus according to the present embodiment. The regulating apparatus 1 is a charge pump type apparatus for equalizing respective voltages across sixteen unit cells B1 to B16 by selecting any one from the unit cells B1 to B16, which are included in a main battery B and connected in series, as a connection cell and connecting the selected connection cell to a capacitor C to transfer stored electric charge among the unit cells B1 to B16 through the capacitor C.

The regulating apparatus 1 according to the present embodiment includes a cell selecting switch group 2, a polarity reversing switch group 3, a voltage detecting switch group 4, a current limiting resistor selecting switch group 8, a buffer circuit 6, the capacitor C, a current limiting resistor group RL and a μCOM 7.

The cell selecting switch group 2, the polarity reversing switch group 3, the voltage detecting switch group 4, the buffer circuit 6 and the capacitor C and the μCOM 7 are equal to those of FIG. 1 and their detailed description will be omitted.

The current limiting resistor group RL is provided between the polarity reversing switch group 3 and the capacitor C and includes a plurality of current limiting resistors RL1 to RLn having difference resistance values. The current limiting resistor selecting switch group 8 is configured by selectively interposing any one of the current limiting resistors RL1 to RLn between any one of the unit cells B1 to Bn selected by the cell selecting switch group 2 and the capacitor C, and includes n switches S81 to S8*n* connected to the current limiting resistors RL1 to RLn in series. The switches S81 to S8*n* included in the current limiting resistor selecting switch group 8 are turned on/off by the CPU 72.

Figure 6:
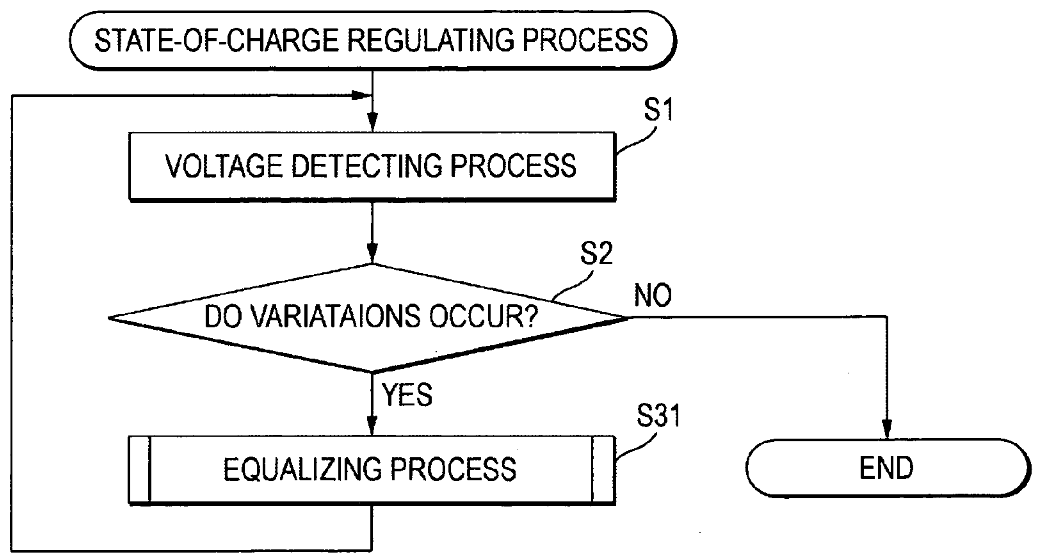
FIG. 6 is a flowchart showing a state-of-charge regulating process of a CPU 72 included in the regulating apparatus 1 of FIG. 5.
Figure 7:
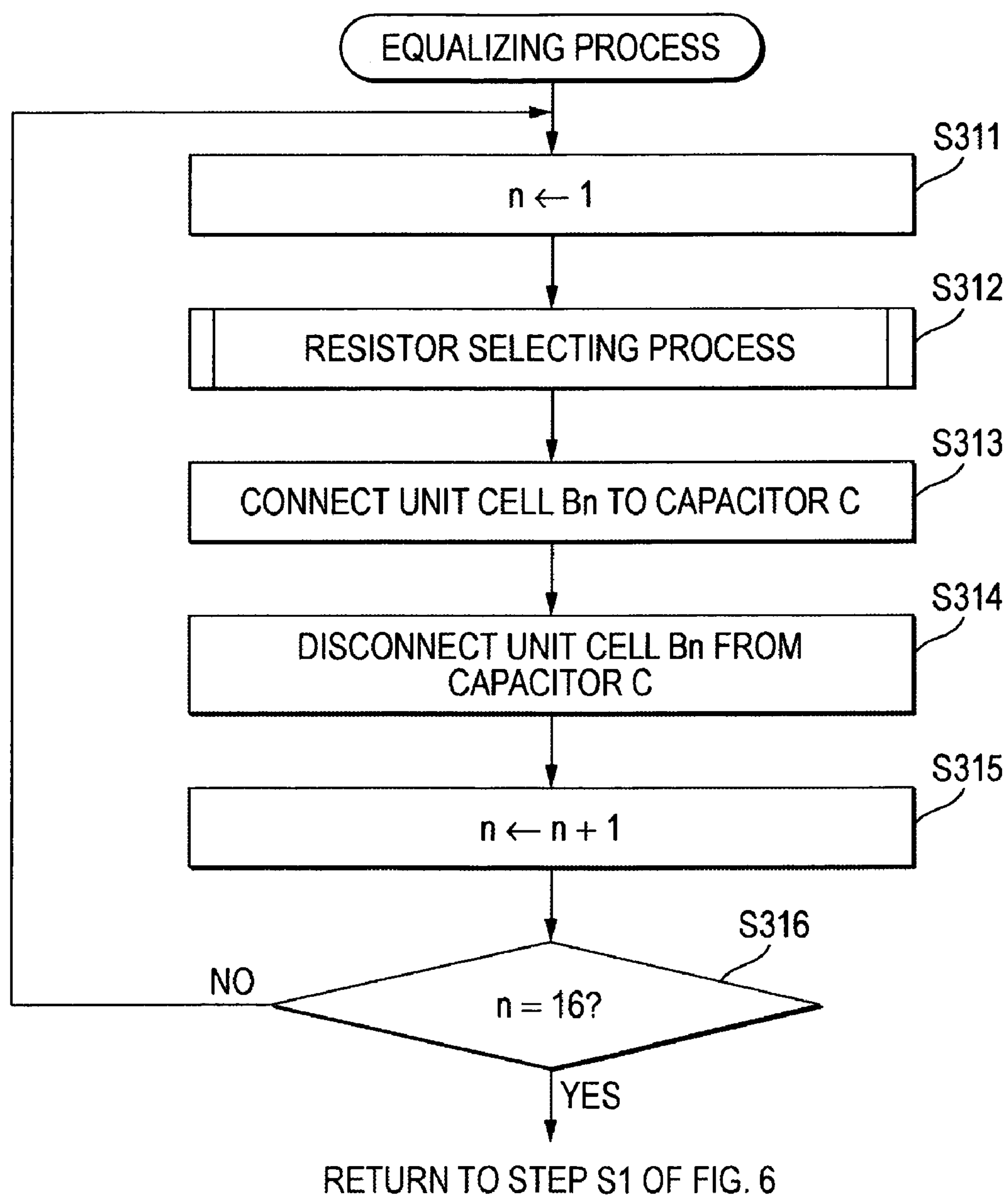
FIG. 7 is a flowchart showing an equalizing process of the CPU 72 included in the regulating apparatus 1 of FIG. 5.
Figure 8:
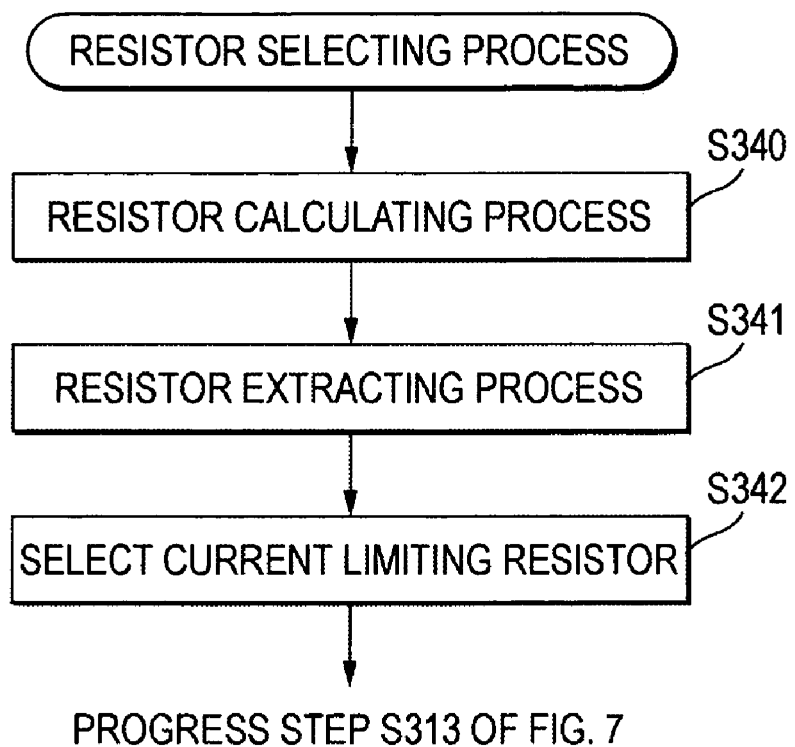
FIG. 8 is a flowchart showing a resistor selecting process of the CPU 72 included in the regulating apparatus 1 of FIG. 5.

Hereinafter, the operation of the regulating apparatus 1 having the above-described structure will be described with reference to FIGS. 6 to 8. FIG. 6 is a flowchart showing a state-of-charge regulating process of the CPU 72 included in the regulating apparatus 1 of FIG. 5. FIG. 7 is a flowchart showing an equalizing process of the CPU 72 included in the regulating apparatus 1 of FIG. 5. FIG. 8 is a flowchart showing a resistor selecting process of the CPU 72 included in the regulating apparatus 1 of FIG. 5.

The CPU 72 included in the μCOM 7 initiates the state-of-charge regulating process by, for example, turning off the ignition switch. In the same steps as FIG. 2 are denoted by the same reference numerals and their detailed description will be omitted. As shown in FIG. 6, in the state-of-charge regulating process, the CPU 72 performs the voltage detecting process for detecting the respective voltages across the unit cells B1 to B16 (step S1). Next, the CPU 72 determines whether variations occur in the respective voltages across the unit cells B1 to B16, based on the respective voltages across the unit cells B1 to B16 detected in the voltage detecting process (step S2).

If it is determined that the variations do not occur (N in the step S2), the CPU 72 finishes the state-of-charge regulating process, without performing the equalizing process of the below-described step S31. Meanwhile, if it is determined that the variations occur (Y in the step S2), the CPU 72 performs the equalizing process which equalizes the respective voltages across the unit cells B1 to B16 by selecting one from the unit cells B1 to B16 as the connection cell and connecting the selected connection cell to the capacitor C to transfer stored electric charge among the unit cells B1 to B16 through the capacitor C (step 31). Then, the CPU 72 returns the process to the step S1.

Hereinafter, the detailed operation of the equalizing process will be described with reference to FIG. 7. First, the CPU 72 acts as cell selecting means, sets a counter value n to 1, and selects the unit cell B1 as the connection cell (step S311). Next, the resistor selecting process for selecting one resistor according to a difference between the voltage across the capacitor C and the voltage across the connection cell Bn from the plurality of current limiting resistors RL1 to RLn is performed (step S312). In the resistor selecting process, the CPU 72 selects a smaller resistor value as the difference $|Vn-Vc|$ between the voltage across the connection cell Bn and the voltage across the capacitor C is reduced.

Hereinafter, the detailed operation of the resistor selecting process will be described with reference to FIG. 8. First, the CPU 72 turns on the switches S41 and S42 of the voltage detecting switch group 4 to detect the voltage Vc across the capacitor C and performs a resistor calculating process for calculating a resistance value $|Vn-Vc|/Ip$ for discharging the connection cell Bn by predetermined allowable current Ip when the connection cell Bn is connected to the capacitor C based on the difference $|Vn-Vc|$ between the voltage across the connection cell Bn and the voltage across the capacitor C (step S340). The allowable current Ip is previously determined according to the characteristics of the secondary cell included in the unit cells B1 to B16 and the secondary cell may deteriorate when the discharge is performed by current exceeding the allowable current. When the allowable current Ipc at the time of charging the connection cell Bn is different from the allowable current Ipd at the time of discharging the connection cell Bn, the voltage across the connection cell Bn is compared with the voltage across the capacitor C. If $Vn<Vc$, the resistance value $|Vn-Vc|/Ipc$ is calculated, and, if $Vn>Vc$, the resistance value $|Vn-Vc|/Ipd$ is calculated.

In a RC circuit, as the difference $|Vn-Vc|$ between the voltage across the connection cell Bn and the voltage across the capacitor C is reduced, the charging/discharging of the connection cell Bn is reduced. When the difference $|Vn-Vc|$ between the voltage across the connection cell Bn and the voltage across the capacitor C becomes 0, the charge/discharge current becomes 0. In the resistor calculating process, a resistance value for discharging the connection cell Bn by the allowable current Ip is calculated just after the connection cell Bn in which the charge/discharge current which excessively varies becomes maximum are connected to the capacitor C.

Next, the CPU 72 performs a resistor extracting process for extracting current limiting resistors having the resistance value of at least $|Vn-Vc|/Ip$ calculated by the resistor calculating process from the current limiting resistors RL1 to RLn (step S341). Thereafter, the CPU 72 selects a minimum current limiting resistor from the current limiting resistors extracted in the resistor extracting process (step S342) and the process progresses a step S313. Hereinafter, a case where the current limiting resistor RLm (m is an integer) is selected will be described.

Next, as shown in FIG. 7, the switches S2*n*-1 and S2*n* connected to the both ends of the connection cell Bn is turned on and the switch S8*m* connected to the current limiting resistor RLm selected in the resistor selecting process is turned on. The switches S31 to S34 of the polarity reversing switch group 3 are turned on/off such that the polarities of the connection cell Bn and the capacitor C are matched to each other. Accordingly, the both ends of the connection cell Bn are connected to the capacitor C through the current limiting resistor RLm to transfer the electric charge from the connection cell Bn to the capacitor C (step S313).

Next, when the electric charge is not transferred from the connection cell Bn to the capacitor C or after a predetermined time elapses from the connection, the CPU 72 turns off the switches S2*m*-1 and S2*m*, the switch S8*m* and the polarity reversing switch group 3 to disconnect the connection cell Bn from the capacitor C (step S314). Thereafter, the CPU 72 acts as cell selecting means, increases a count value n by one and selects the unit cell Bn+1 as the connection cell (step S315), and determines whether the count value n becomes 16 (step S316). If the count value n becomes 16 (Y in the step S316), the CPU 72 determines that all the unit cells B1 to B16 are sequentially connected to the capacitor C, and then returns the process to the step S1 of FIG. 6. Meanwhile, if the count value n does not become 16 (N in the step S316), the CPU 72 returns the progress to the step S311.

According to the above-described apparatus for regulating the state of charge, the discharge resistors RL1 to RLn have a plurality of different resistance values, respectively. The CPU 72 selects a smaller resistance values from the plurality of resistance values in the resistor selecting process as the difference |Vn−Vc| between the voltage across the connection cell Bn and the voltage across the capacitor C is reduced, and connects the connection cell Bn to the capacitor C through the current limiting resistor RLm selected in the resistor selecting process and transfers the stored electric charge among the unit cells B1 to B16 through the capacitor to equalize the respective voltages across the unit cells B1 to B16 in the equalizing process. Accordingly, as the difference between the voltage across the connection cell Bn and the voltage across the capacitor C is reduced, the current limiting resistor having the smaller resistance value is interposed between the capacitor C and the connection cell Bn. Thus, although the difference |Vn−Vc| between the voltage across the connection cell Bn and the voltage across the capacitor C is small, the connection cell Bn can be charged/discharged by the large charge/discharge current and a large amount of electric charge can be transferred between the capacitor C and the connection cell Bn in a short time and thus the equalization can be performed in a short time.

According to the above-described apparatus for regulating the state of charge, the CPU 72 selects a minimum resistance value from the resistance values of at least |Vn−Vc|/Ip for charging/discharging the connection cell Bn by the predetermined allowable current Ip in the resistor selecting process, when the connection cell Bn is connected to the capacitor C. Accordingly, the minimum resistance value is selected from the resistance values of at least |Vn−Vc|/Ip for charging/discharging the connection cell Bn by the predetermined allowable current Ip and interposed between the capacitor C and the connection cell Bn, the discharge resistor having the resistance value for allowing largest discharge current from flowing can be selected from the discharge resistors by which the discharge current exceeding the allowable current Ip does not flow. As a result, the equalization can be performed in a shorter time.

In the second embodiment, the resistance value |Vn−Vc|/Ip for charging/discharging the connection cell Bn by the predetermined allowable current Ip is calculated in the resistor calculating process, the resistance values of at least Vn/Ip calculated by the resistor calculating process are extracted from the plurality of resistance values in the resistor extracting process, and the minimum resistance value is selected from the resistance values extracted by the resistor extracting process. However, the present invention is not limited thereto. For example, a table representing a correspondence between the voltage Vn across the connection cell Bn and the resistance values of the current limiting resistors RL1 to RLn, in which, for example, the voltage Vn across the connection cell Bn which is equal to or larger than 0.4 and less than 0.5 corresponds to the resistance value RL1 and the voltage Vn across the connection cell Bn which is equal to or larger than 0.3 and less than 0.4 corresponds to the resistance value RL2, etc., may be previously stored in the storage means such as the ROM 73 and any one of the resistance values of the current limiting resistors RL1 to RLn may be selected according to the table representing the correspondence.

In the table representing the correspondence, the voltage Vn across the connection cell Bn may correspond to the resistance values of the current limiting resistors RL1 to RLn such that the minimum resistance value is selected from the resistance values of at least |Vn−Vc|/Ip for charging/discharging the connection cell Bn by the allowable current Ip or a smaller resistance value may be selected as the voltage across the connection cell Bn is reduced.

In the second embodiment, one unit cell is sequentially selected from the unit cells B1 to B16 and connected to the capacitor C. However, the present invention is not specially limited as long as the unit cells B1 to B16 may be connected to the capacitor C such that the electric charge can be transferred from the unit cell having a large voltage to the unit cell having a small voltage through the capacitor C. For example, the operation for alternately selecting the unit cell having a maximum voltage and the unit cell having a minimum voltage as the connection cell may be repeated. Alternatively, the operation for alternately selecting at least two unit cells Bn, Bn+1, . . . connected in series and the minimum unit cell Bmin from the unit cells B1 to B16 may be repeated. When the at least two unit cells Bn, Bn+1, . . . are selected as the connection cell, the current limiting resistor having the resistance value according to the sum (Vn+Vn+1 . . . ) of the respective voltage Vn, Vn+1, . . . across the unit cells Bn, Bn+1, . . . included in the connection cell is selected.

In the second embodiment, the plurality of current limiting resistors RL1 to RLn having different resistance values are provided and one current limiting resistor is selected from the n current limiting resistors and connected to the connection cell Bn. However, the present invention is not specially limited as long as the plurality of resistance values is provided such that the current limiting resistors having the plurality of resistance values can be selectively interposed between the connection cell Bn and the capacitor C. For example, the plurality of resistance values may be selectively provided by providing n discharge resistors having a same resistance value in parallel and selecting the number of the current limiting resistors connected to the connection cell. A combination of at least two of the discharge resistors RL1 to RLn having different resistance values may be selected.

Although, in the first and second embodiments, 16 unit cells B1 to B16 are described, the number of the unit cells is not specially limited as long as the plurality of unit cells are connected in series. In the first and second embodiments, the cell selecting switch group 2 includes total sixteen switches including the switches S20 and S216 provided at the both ends of the battery assembly B and the switches S21 to S215 provided among the unit cells B1 to B16 one by one. However, the present invention is not limited thereto and a pair of switches may be provided at each of the both ends of the unit cells B1 to B16 such that total 32 switches configure the cell selecting switch group 2. In this case, the polarity reversing switch group 3 is unnecessary.

The above-described embodiments are only representative aspects of the present invention and the present invention is not limited to the embodiments. That is, the present invention may be variously changed without departing from the spirit of the present invention.

What is claimed is:

1. An apparatus for regulating state of charge in a battery assembly, the apparatus comprising:

discharge resistors which discharge a plurality of unit cells included in the battery assembly and connected in series;

a cell selector, which selects at least one from the plurality of unit cells as a connection cell; and an equalizer, which connects the connection cell selected by the selector to the discharge resistor and discharges the electric charge of the connection cell to equalize respective voltages across the unit cells;

wherein the discharge resistors have a plurality of resistance values, and wherein the equalizer has a resistor selector which selects one resistance value according to the voltage across the connection cell from the plurality of resistance values and connects the connection cell to one discharge resistor having the resistance value selected by the resistor selector among the discharge resistors.

2. The apparatus for regulating state of charge according to claim 1, wherein the resistor selector selects a minimum resistance value from the resistance values equal to or larger than a resistance value for discharging the connection cell by predetermined allowable current.

3. An apparatus for regulating state of charge in a battery assembly, the apparatus comprising:

a capacitor through which stored electric charge is transferred among a plurality of unit cells included in the battery assembly and connected in series;

a selector, which selects at least one from the plurality of unit cells as a connection cell;

an equalizer, which connects the connection cell selected by the selector to the capacitor and transfers stored electric charge among the unit cells through the capacitor to equalize respective voltages across the unit cells; and current limiting resistors which limit charge/discharge current which flows in the connection cell, wherein the current limiting resistors have a plurality of resistance values, and wherein the equalizer has a resistor selector which selects one resistance value according to a difference between a voltage across the connection cell and a voltage across the capacitor from the plurality of resistance values and connects the connection cell to the capacitor through one current limiting resistor having the resistance value selected by the resistor selector among the current limiting resistors.

4. The apparatus for regulating state of charge according claim 3, wherein the resistor selector selects a minimum resistance value from the resistance values equal to or larger than a resistance value for charging/discharging the connection cell by predetermined allowable current when the connection cell is connected to the capacitor.

5. An apparatus for regulating state of charge in a battery assembly, the apparatus comprising:

means for discharging a plurality of unit cells included in the battery assembly and connected in series;

means for selecting at least one unit cell from the plurality of unit cells, discharged by the means for discharging, as a connection cell; and equalizing means, which connects the connection cell selected by the means for selecting to the means for discharging and discharges the electric charge of the connection cell to equalize respective voltages across the unit cells;

wherein the means for discharging has a plurality of varying resistance values, and wherein the equalizing means has a resistor selecting means which selects one resistance value according to the voltage across the connection cell from the plurality of resistance values and connects the connection cell to a means for discharging having the resistance value selected by the resistor selecting means among the means for discharging.

* * * * *